Re.25634
Aug. 10, 1954  R. W. PRINGLE ET AL  2,686,266
IMPROVEMENTS IN RADIATION DETECTORS
Filed Jan. 12, 1950  2 Sheets-Sheet 1
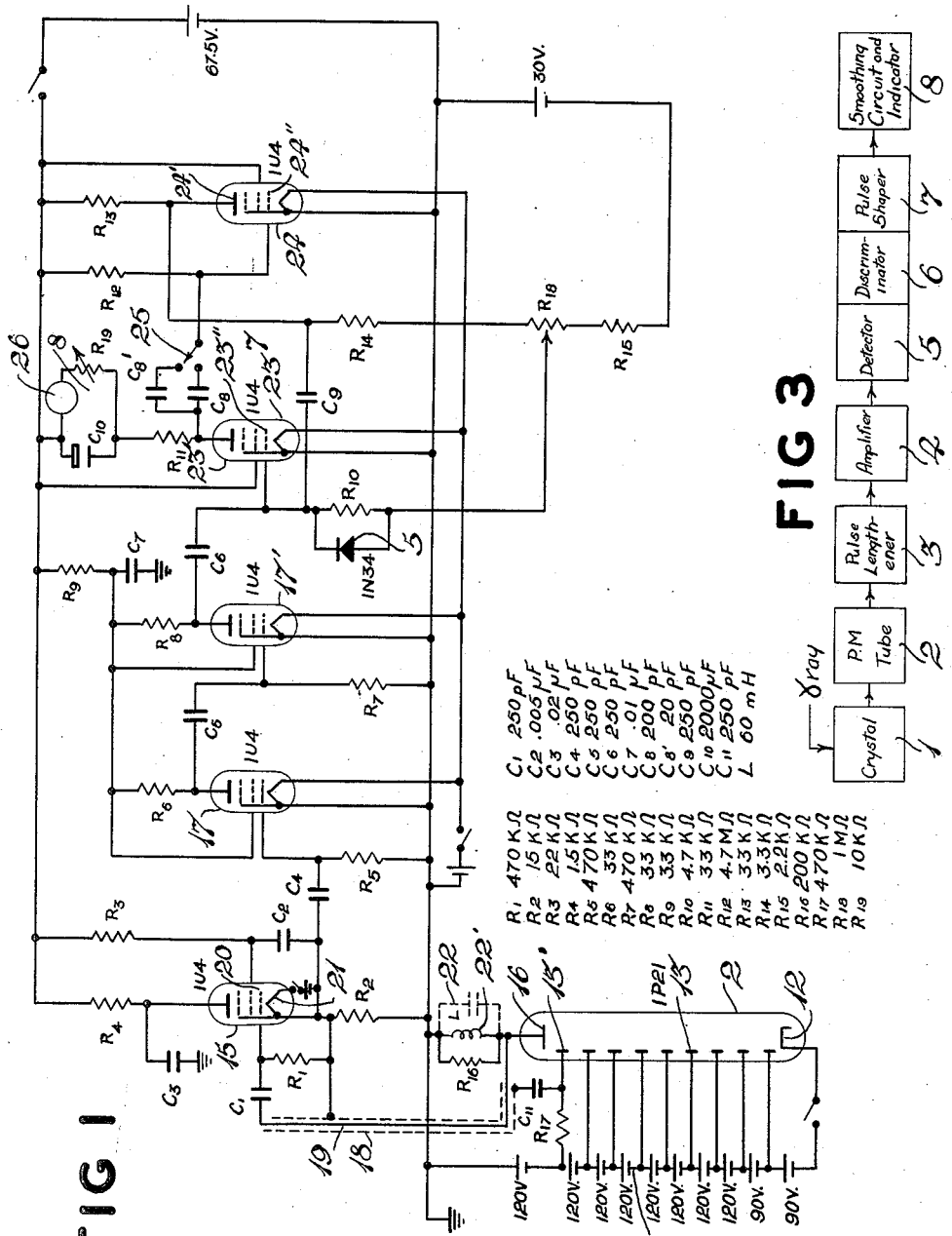
Inventors:
Robert W. Pringle
Kenneth I. Roulston
George M. Brownell
By: Fetherstonhaugh & Co
his Attys Aug. 10, 1954  R. W. PRINGLE ET AL  2,686,266
IMPROVEMENTS IN RADIATION DETECTORS
Filed Jan. 12, 1950  2 Sheets-Sheet 2

Inventors:
Robert W. Pringle
Kenneth I. Roulston
George M. Brownell
By: Fetherstonhaugh & Co
his Atty's Patented Aug. 10, 1954

2,686,266

UNITED STATES PATENT OFFICE 2,686,266

IMPROVEMENT IN RADIATION DETECTORS

Robert W. Pringle, Kenneth I. Roulston, and George M. Brownell, Winnipeg, Manitoba, Canada Application January 12, 1950, Serial No. 138,218

Claims priority, application Canada November 10, 1949

23 Claims. (Cl. 250—71)

The invention relates to new and useful improvements in meters, specifically portable meters adapted for the detection and measuring of atomic rays such as gamma rays or neutrons, an object of our invention being to provide a device of the character herewithin described which is particularly suitable for use in mining and prospecting, including use in bore holes, for the detection of radioactive minerals, petroleum and the like.

The expression "atomic rays" or "radiation" as used herein is meant to embrace nuclear radiation and particles as well as atomic radiation and particles.

A further object of the invention is to provide a device of the character herewithin described, which, due to the novel design thereof is extremely portable thereby rendering same adaptable for use in radiation surveys, for the assaying of radioactive samples and general purpose detection and recording of gamma ray intensities and energies.

Another object of the invention is to provide a device of the character herewithin described, which, due to the capacity thereof to record energies of gamma rays, makes it particularly suitable for use in the identification of radioactive minerals, liquids, gases and other substances.

Another object of the invention in conjunction with the foregoing objects is to provide a device of the character herewithin described which is extremely sensitive and which, is substantially more efficient than the conventional Geiger counter normally used as a portable instrument. With this new instrument a detection sensitivity of $10^{-10}$ roentgens per second has been attained and this figure shows the device conservatively speaking to be 50 to 100 times more sensitive for the detection of gamma rays than the best and most complicated Geiger counting systems.

In conjunction with the foregoing objects, the device hereinafter to be described is readily adaptable for use in prospecting for radioactive mineral deposits from aircraft. For this purpose an instrument of extreme sensitivity and rapidity of response is essential. A modification of the instrument to include larger crystals or to use two or more photomultiplier tubes and crystals in combination, is necessary, in this case, to obtain the most efficient operation. Aerial prospecting for uranium requires some means of distinguishing from the air between uranium deposits and masses of potash-bearing rock. This can be achieved by the application of this invention.

By using small "probes" or "pointers" made with relatively small crystals, the meter is readily adaptable for use in both biological and medical research and practice, therefore, another object of the invention might be stated to be the use of the meter in detecting and tracing radioisotopes in living organisms, a use which is particularly suitable for determining the precise location and measurement of small areas of radiation. Also the increased sensitivity of the instrument will permit the use of smaller quantities of such radioisotopes. In view of certain recent experiments, a likely application of the device is the detection of cancerous tissue in the human body.

By rearranging the component parts of the meter, it can be readily adapted for use in radiation surveys of oil wells and other bore holes to obtain radioactivity logs of both gamma ray and neutron intensities, thus providing a much more reliable and sensitive device than has been available hitherto.

In this connection it will be appreciated that the gamma rays referred to in this context may either be natural occurring gamma rays or gamma rays produced as a result of neutron capture processes.

A further object of the invention in conjunction with the foregoing is to provide a scintillation spectrometer particularly suitable for use in bore holes whereby continuous records of the intensities and energies of the naturally occurring and neutron capture gamma rays may be obtained, which permits a determination to be made of the location and nature of firstly, naturally occurring radioactivity, and secondly the physical and chemical structure of the strata. The advantages of locating the natural occurring radioactivity sources in bore holes are (1) to provide an easily identifiable marker for further operations in the hole, (2) to assist in the study of the oil field structure and (3) in certain cases to identify the oil bearing zone. By the use of a neutron source in conjunction with the crystal and photosensitive means within the bore hole we can ascertain (1) the location of the oil bearing strata, (2) the location of the salt water normally associated with the deposit of the oil and (3) organic and mineral formations. It will be obvious in the foregoing that the rate meter and recording components of the spectrometer require to be remotely connected electronically to the aforementioned components within the bore hole and by this means recordings may be made to a depth of fifteen thousand feet or more. Furthermore, the use of multi-channel recording permits simultaneous observation of naturally occurring radioactivity and neutron induced gamma rays.

Another object of the invention is to provide a device of the character herewithin described which may be used as a health survey meter or monitor, either for normal use in the laboratory or for civil or armed forces defence.

A still further object of the invention is to provide a device of the character herewithin described which, by use of an inductance, acting as a load on the multiplier tube, lengthens the current pulses emanating therefrom and permits their amplification economically with battery operated tubes. This provides a voltage pulse the duration of which is considerably greater than that of the originating scintillation, thereby simplifying the problem of amplification.

Another object of the invention is to provide a device of the character herewithin described which includes a flip-flop circuit for operating a counting-rate meter. The use of this circuit permits discrimination against pulses of less than any desired amplitude. By proper selection of this amplitude, it is possible to eliminate most of the pulses due to noise in the photomultiplier tube while relatively few pulses due to scintillations are rejected. Also by variation of this amplitude setting, it is possible to determine the size distribution of the pulses due to scintillations and hence the energies of the gamma rays involved. If only one flip-flop circuit is employed we can refer to the device as an integral discriminator. A simple adaptation of this has been made to pick out or isolate gamma ray pulses in a given range of predetermined pulse heights. This is achieved by using two integral discriminators biased to the two levels determining the above range. The outputs from these two discriminators are subtracted electronically or mechanically by one of the following methods, thus forming a "differential" discriminator:

(a) By passing the output currents through the indicator coil in opposite directions, (b) Using a two coil indicator and passing the output currents from the individual discriminators through the separate coils.

(c) Electrically balancing the two storage, or smoothing, circuits against each other, (d) Using a pulse anti-coincidence circuit which would require to be followed by a pulse shaping and rate-meter circuit.

A yet further object of the invention is to provide a device of the character herewithin described in which the crystal phosphor used is shaped and protected in order to retain and transfer to the photo-sensitive surfaces of the photo-multiplying tube or image dissector tube the maximum amount of light from the scintillation occurring within the crystal.

A still further object of the invention is to provide a device of the character herewithin described which utilizes relatively small "hearing-aid" type batteries for the production of a portable 1,000-volt supply for the photomultiplier cell in such a manner as to eliminate excessive current drain and possible battery noises which would arise from the use of a potentiometer resistance chain.

With the foregoing objects in view, and such other objects and advantages as will become apparent to those skilled in the art to which this invention relates as this specification proceeds, our invention consists essentially in the arrangement and construction of parts all as hereinafter more particularly described, reference being had to the accompanying drawing which shows a front plan view of our device sectioned in part for clarity.

Figure 1 is a wiring diagram of the circuit used showing the values of the various components used in this embodiment.

Figure 3 is a block schematic view of Figure 1.

In the drawings like characters of reference indicate corresponding parts in the different figures.

Figure 4:
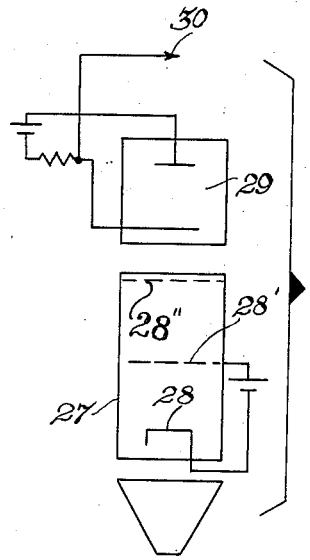
Figure 4 is an enlarged schematic diagram of an alternative to the photo-multiplying tube, the component used in this case being an image dissector tube.

The conventional Geiger counter, the portable version of which is normally used for surveying, and general purpose work in connection with the detection and recording of gamma ray intensities, suffers from many disadvantages, chief among which is the limited range of the instrument, due to its inherently low sensitivity (0.1 to 1.0 per cent) and the fact that only the intensity of the rays can be measured and not the energies thereof. These disadvantages make the portable Geiger counter at best, an instrument, the uses of which are strictly limited.

The meter hereinafter to be described has, by the use of novel principles, overcome the disadvantage of lack of sensitivity of Geiger counters in the detection and recording of gamma rays. Thus an instrument has been provided many times more sensitive than a Geiger counter, be it powered by dry batteries and contained within a portable pack, or non-portable and located adjacent to an adequate power supply.

Another novel feature of the meter is the ability to detect and record the "energies" emitted by the gamma radiation rather than the "intensity" thereby permitting the identification of various radioactive minerals such as, uranium, thorium, and potassium.

In principle, the operation of the instrument is shown in Figure 3 of the accompanying drawing and depends basically upon the properties possessed by certain crystals of scintillating when bombarded by gamma rays. Examples of these crystals are naphthalene, anthracene, stilbene, chrysene, calcium or cadmium tungstate, potassium or sodium iodide activated with thallium. In the present embodiment, sodium iodide activated with thallium has been chosen because the conversion of gamma ray energy to light scintillations appears to be more efficient in a crystal of this composition than in other known scintillators, with the exception of the tungstates, the preparation of which is extremely difficult.

In Figure 3, the crystal is identified by the reference character 1, within which gamma rays cause scintillations to occur. These scintillations are converted to pulses of current by causing same to illuminate a photo-sensitive surface contained within a photomultiplier tube 2. After electron multiplication of the pulses has occurred within the photo-multiplying tube, they are increased in width to facilitate the amplification thereof, by means of a pulse lengthening device 3 from whence the pulses are passed to amplifying circuit 4 and thence to the detector 5. From the detector they are fed to a flip-flop, trigger, or other suitable circuit which serves the function of a discriminator 6 and a pulse shaper 7. From this circuit the emissions pass to a smoothing circuit and indicator identified by the reference character 8.

In detail, the crystal 1 is illustrated more particularly in Figure 2 of the accompanying drawings and takes the form of a truncated cone or polyhedron so shaped that light totally reflected inside same may have its direction changed in such a way as to give a greater proportion of the light an opportunity to emerge subsequently from the base 9 and strike the photo-sensitive surface of the photo-multiplying tube 2. In this connection it is necessary to use a single crystal having a mass not less than 10 grams in order to measure most accurately the energies of the gamma rays.

Figure 2:
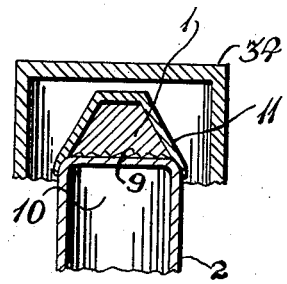
Figure 2 is an enlarged fragmentary side section of the end of a photomultiplier tube with the crystal secured thereto.

As will be seen from Figure 2 of the accompanying drawings, the crystal 1 is secured upon the flattened end of the tube 2, the base 9 of the crystal being hollowed slightly to conform with the configuration of the slightly curved end 10 thereof. In order to improve the efficiency further of the transference of the scintillations, the crystal is cemented to the glass of the tube 2 with a suitable transparent cement and the faying surface of the crystal adjacent to the multiplier tube is roughened or ground in order to prevent the scintillations from being reflected from the surface instead of passing therethrough.

The crystal used in the embodiment described herein has a disadvantage inasmuch as it is hygroscopic, therefore, same has to be protected from the effect of moisture in the atmosphere by covering same by means of a protective shield 11. In this embodiment, this takes the form of a foil preferably adhesively secured to the crystal which also serves the purpose of reflecting any light emerging from parts of the crystal not adjacent to the photo-multiplying tube 9 back towards the end 10 of the tube 2. It is to be understood, however, that many other materials may be used to prevent moisture deterioration occurring such as one of the plastics, silicons, paraffin wax or the like.

As has hereinbefore been described, the crystal 1 possesses the property of scintillating when subjected to gamma ray radiation or bombardment. The light scintillations occurring within the crystal are relatively small, consequently, the conversion of same to pulses of current requires the use of an extremely photo-sensitive surface contained within the photo-multiplying tube 2. The cathode 12 of the tube 2 forms the photo-sensitive surface and transfers the scintillations of the crystal 1 into current pulses. The scintillations cause electrons to be emitted from the cathode which are then amplified by means of the dynodes 13 which are defined as electron multiplying means in the claims appended thereto, and which are energized by means of a relatively small battery 14 which takes the form of a power-pack normally used in hearing-aids or the like. This form of amplification is essential as if the normal thermionic vacuum tube type of amplifier were used at this stage it would introduce noise pulses of much greater magnitude than the original pulses formed at the cathode.

The pulses obtained from photo-multiplying tubes at present available still require further amplification but if a photo-multiplying tube of higher efficiency is designed the further amplification stages may not be required.

In order that the magnitude of the voltage pulse which is propagated by the photomultiplier tube be the highest possible, a cathode follower 15 is provided. This couples the collector plate 16 of the photo-multiplying tube with the first stage of amplification 17. The output pulse of current passes through the load on the multiplier tube 2, which load is shunted by stray capacities and the magnitude of the voltage pulse resulting, depends upon the inverse of the stray capacity. For this reason, it is desirable to reduce the output capacity as much as possible and is achieved by making the wire shielding 18, on the lead 19 which connects the collector plate 16 of the multiplier tube to the grid 20 of the cathode follower tube 15, and the last dynode 13' (which shields the collector plate 16) both follow the collector voltage by being connected to the cathode 21 of the cathode follower tube 15. This considerably reduces the capacity and effectively increases the voltage output.

Because of the relatively short duration of the light flashes from the crystal 1, which vary from $10^{-9}$ to $10^{-6}$ of a second, and because the current pulses emanating from the photomultiplier tube resulting from these scintillations are only slightly longer, it is extremely difficult to amplify these short pulses economically with battery-operated tubes. Consequently, what is defined as a pulse lengthening device has been incorporated which yields a damped oscillatory voltage, the frequency of which is approximately 150 kilocycles, thereby simplifying the problem of amplification.

The pulse lengthening device 22 comprises an inductance coil 22' which provides a load for the collector plate 16 of the tube 2.

The resultant lengthened pulses pass from the cathode follower tube 15 to the amplifying stages 17 and 17' which are conventional and which may take the form either of a tuned narrow band amplifier or a resistance loaded, but wider band, amplifier. In this context it is to be noted that, since the input signal consists of a short train of waves, either a positive or negative pulse may be obtained at any stage in the amplifier simply by rectification. As hereinbefore described, the amplifying stages 17 and 17' may be eliminated with the future advent of photo-multiplying tubes of considerably higher amplification characteristics.

The output from the amplifier stage 17' is fed into a flip-flop circuit comprising a detector 5, a discriminator and pulse shaper which, in the schematic block diagram Figure 3 are identified by the reference characters 6 and 7 respectively but which, in the wiring diagram shown in Figure 1, are included in the entire flip-flop circuit collectively designated 7.

A pair of tubes 23 and 24 are arranged so that the anode 23' of the tube 23 is coupled to the grid 24'' of the tube 24 through a condenser C8 or C8', and grid leak R12, and likewise, the anode 24' of tube 24 is coupled to the grid 23'' of the tube 23 through condenser C9 and grid leak R14.

In operation of this portion of the circuit, tube 23 is normally biased beyond cut-off so that current does not flow. If a sufficiently large pulse of current is impressed upon the grid 23'' of tube 23, such as the output pulse of the amplifying stage 17', to cause it to pass current, the consequent negative pulse developed at the anode 23' of this tube causes the grid 24'' of the second tube 24 to go negative. The negative charge on grid 24″ increases the potential of the anode 24′ and in turn, the potential of grid 23″ is caused to rise. This interaction of tubes 23 and 24 is cumulative until tube 23 is conducting fully, and tube 24 is cutoff, due to the negative bias on the grid 24″ thereof.

This bias, however, is not maintained due to grid leak resistances R11 and R12 which cause diminution of the charge accumulated upon condenser C8 or C8′ (selection of which is determined by means of the switch key 25), and after a certain point the tube 24 will again begin to pass current and will continue to do so until the previous conditions are reversed and tube 23 is cutoff.

The time constant of the circuit as determined by the capacitance and resistance, results in the output of a pulse of predetermined duration and of square form thus justifying the term "pulse-shaper" for this function.

It is to be noted that in a purely conventional manner, the foregoing arrangement of the two tubes 23 and 24 begins as a stable arrangement. A minute voltage change, however, which rapidly builds up, converts this into an unstable condition thereby causing the tube to "flip" over into a stable condition, remaining in this state until, due to the charge or discharge of a grid condenser, they become unstable and "flop" back into a stable condition.

The pulse required to set off this reaction is termed a trigger pulse and the amplitude of this pulse voltage will vary according to the setting of the bias on the first tube. This feature enables the arrangement to function as a discriminator.

The crystal detector 5 in the input circuit of tube 23 is a germanium crystal diode and is incorporated for two principal reasons. Firstly, it is required to rectify the signal produced by the amplifying stages 17 and 17′ to give a positive pulse to trigger the flip-flop, and secondly, in clamping the input grid of the first tube 23 of the flip-flop circuit during its recovery. Due to the minimal inductance of this circuit, the electrical inertia is very small, thus making the flip-flop ready to accept further pulses with a minimum of inactive or dead time.

Visible indication of current pulses which pass through the flip-flop circuit tubes 23 and 24 is provided by an indicator in the form of a microammeter 26 which is in the output of the first tube 23 of the flip-flop circuit. This meter is shunted by a relatively large capacitance C10 which serves to smooth out statistical fluctuations in the pulses being counted and also reduces the A. C. impedance of the meter to a negligible quantity. In at least one of the claims appended hereto, this portion of the circuit is designated as a smoothing circuit and indicator, and is identified by the reference character 8 in the block schematic diagram of Figure 3.

The quantity indicated in the instrument will be the average current passing through the tube 23, which means that the reading is proportional to the rate at which pulses are accepted by the flip-flop portion of the device.

For this reason, when high counting rates are encountered, it is desirable to have a flip-flop pulse as short as possible in order that the greatest number of such pulses may be counted. However, each pulse will be reduced in intensity, thus reducing the sensitivity of the meter. An alternative to this is to change the range of the meter, but this does not reduce the pulse duration and many pulse counts will be lost due to the inability of the flip-flop circuit to accept same.

The resistance R19 in series with the smoothing capacitance is variable, thus enabling the variation of the time during which the rate-meter averages the current. Also, to achieve the same result and, to assist and broaden the variation, the capacitance may be altered. The combination of crystal, photo-multiplier tube and rate meter is a novel one for use in gamma ray measurement with the scintillation counter. For our purposes in estimating radiation intensities continuously and rapidly, the rate meter has very great advantages over the conventional digital counter.

It is possible to have several modifications in methods of indication. For example, a pulse-dividing or pulse-demultiplier circuit with earphones could be used since without this direct counting by ear is not possible because the rate is generally too high and only an approximate qualitative estimate by changes in the intensity of the noise could be obtained. Alternatively, the instrument can be operated in a condition where only the largest pulses are recorded and these are passed to the earphone circuit. This can be achieved by using the discriminator control, but in this way much of the inherent sensitivity is lost. Further, an integrating circuit with a reset switch or a digital electronic counter with or without a mechanical counter and reset switch could be incorporated.

As hereinbefore described, the amplitude of the voltage pulse required to trigger the flip-flop circuit will vary according to the setting of the bias on the first tube 23 of the pair. It is by this means that discrimination against small amplitude pulses, which include noise pulses, is obtained.

From the "differential" pulse height distribution curve, it is possible to identify the Compton distributions of the energies of the electrons produced in the crystal by the gamma rays. Hence, a measure can be obtained directly of the energies of these gamma rays. The "differential" pulse height curve is obtained from the slope of the integral bias curve—i. e. of the variation of meter readings with discriminator setting or directly by making use of a "differential" discriminator as hereinbefore described. Thus the device functions as a portable gamma ray spectrometer of extreme sensitivity, and experiment has shown that gamma rays of energy as low at 20 k. e. v. can be measured.

The circuit is powered by various batteries as shown, each of which is conventional and make and break switches are provided as required. These features together with the various resistances and condensers are conventional and it is not deemed necessary to give further explanations thereof.

Figure 4 of the accompanying drawings shows an alternative embodiment of the photo-sensitive surface included within what is known as an image dissector tube collectively designated 27. This comprises a photo-sensitive surface or cathode 28, which emits electrons when the crystal 27′ which is adjacent to the cathode, scintillates. These electrons are accelerated by means of the grid 28′ to a phosphorescent screen 28″ which scintillates due to the impact of the electrons. These scintillations are much more intense than the scintillations in the crystal, hence light amplification has been attained. The scintillations from the phosphorescent screen are detected by an ordinary photo-electric cell 29 from whence the current passes to a circuit similar to that illustrated in Figure 1, and which is indicated as following the line terminating with the arrowhead 30.

Figure 5:
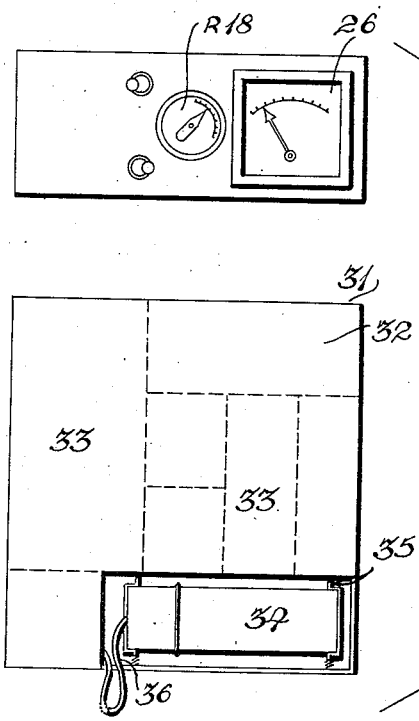
Figure 5 is a side and top plan elevation of a proposed portable unit showing the relative position of the various components.

Figure 5 of the accompanying drawings shows a suggested pack or container 31 and illustrates the layout of the various components, the electronic section being contained within the block 32 with the various batteries contained within the area designated 33.

The photo-multiplying tube is contained within a protective metal casing 34 and held for storage within conventional spring clips 35 situated within the base of the case. The conductor 36 extends from the photo-multiplying tube to the interior of the case 31 and is provided with several feet of extension cord in order that the tube may be taken out when in use.

It is desired to stress the fact that with the arrangement hereinabove described, the energy of the gamma radiation is detected and measured in addition to the intensity thereof thereby permitting a distinction to be made in emissions of radioactive substances of different characteristics such as uranium, thorium, and potassium and the like and in the nature of the neutron capture gamma rays emitted by the nuclei of different materials.

Furthermore, neutrons may be detected by the use of a layer of hydrogenous material over the crystal from whence come recoil protons which are recorded by the crystal, or by the use of a crystal of anthracene or other organic material in which recoil protons are produced directly. In this case, also the energies of the neutrons are simply related to the size of the scintillation pulses. Hence the device may be used as a portable neutron spectrometer for fast neutrons, even when the energies involved are hundreds of m. e. v. Alternatively, work has shown that a crystal of sodium iodide activated by thallium can itself be used in neutron detection.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. In a meter for the detection and measuring of gamma rays in combination, a single unit crystal, having a mass of at least 10 grams, capable of scintillating under the impact of gamma rays, said meter having a photo-sensitive surface illuminable by the scintillations from said crystal, for converting same into electronic emissions, means associated with said photo-sensitive surface to amplify said electronic emissions, and an indicator electronically connected to said means for signalling the characteristics of the radiation bombarding said crystal.

2. In a meter for the detection and measuring of gamma rays, in combination, a single unit crystal, having a mass of at least 10 grams, capable of scintillating under the impact of gamma rays, said meter including a photo-multiplying tube, said tube including a photo-sensitvie surface, electron multiplication means, and a collector plate, said crystal being secured adjacent to said photo-sensitive surface, and an indicator electronically connected to the plate of said tube for signalling the characteristics of the radiation bombarding said crystal.

3. In a meter for the detection and measuring of gamma rays, in combination, a crystal capable of scintillating under the impact of gamma rays, said crystal being of conical configuration, said meter having a photo-sensitive surface illuminable by the scintillations from said crystal, for converting same into electronic emissions, electron multiplication means associated with said photo-sensitive surface to amplify said electronic emissions, and an indicator electronically connected to said electron multiplication means for signalling the characteristics of the radiation bombarding said crystal.

4. In a meter for the detection and measuring of gamma rays, in combination, a crystal capable of scintillating under the impact of gamma rays, said meter including a photo-multiplying tube, said tube including a photo-sensitive surface, electron multiplication means, and a collector plate, said crystal being secured adjacent to said photo-sensitive surface, the sides of said crystal when in situ inclining upwardly and inwardly from the end of said tube, and an indicator electronically connected to the plate of said tube for signalling the characteristics of the radiation bombarding said crystal.

5. In a meter for the detection and measuring of gamma rays, in combination a crystal capable of scintillating under the impact of gamma rays, said meter including a photo-multiplying tube, said tube including a photo-sensitive surface illuminable by the scintillations from said crystal, for converting same into electronic emissions, electron multiplication means in said tube to amplify said electronic emissions, a plate for collecting said magnified emissions, an indicator electronically connected to said tube for signalling the characteristics of the radiation bombarding said crystal, and a shield surrounding said crystal capable of preventing moisture deterioration of said crystal and for reflecting scintillations internally.

6. In a meter for the detection and measuring of gamma rays, in combination, a crystal capable of scintillating under the impact of gamma rays, said meter including a photo-multiplying tube, said tube including a photo-sensitive surface illuminable by the scintillations from said crystal, for converting same into electronic emissions, electron multiplication means in said tube to amplify said electronic emissions, a plate for collecting said magnified emissions, an indicator electronically connected to said tube for signalling the characteristics of the radiation bombarding said crystal, and a shield surrounding said crystal capable of preventing moisture deterioration of said crystal and for reflecting scintillations internally, said crystal being secured adjacent to the end of said tube.

7. In a meter for the detection and measuring of gamma rays, in combination, a crystal capable of scintillating under the impact of gamma rays, said meter including a photo-multiplying tube, said tube including a photo-sensitive surface illuminable by the scintillations from said crystal, for converting same into electronic emissions, electron multiplication means in said tube to amplify said electronic emissions, a plate for collecting said magnified emissions, an indicator electronically connected to said tube for signalling the characteristics of the radiation bombarding said crystal, and a shield surrounding said crystal for preventing moisture deterioration of said crystal and for reflecting scintillations internally, said crystal being adhesively secured adjacent to the end of said photo-multiplying tube.

8. In a meter for the detection and measuring of gamma rays, in combination, a crystal, having a mass of at least 10 grams, capable of scintillating under the impact of gamma rays, said meter including a photo-multiplying tube, said tube including a photo-sensitive surface, electron multiplication means, and a collector plate, said crystal being secured adjacent to said photo-sensitive surface, pulse shaping means in the form of a univibrator circuit, and a rate meter in association with said pulse-shaping means, said rate meter comprising a smoothing circuit and an indicator for signalling the characteristics of the radiation bombarding said crystal, whereby the nature of the radiation sources is ascertained.

9. In a meter for the detection and measuring of gamma rays, in combination, a crystal capable of scintillating under the impact of gamma rays, said meter including a photo-multiplying tube, said tube including a photo-sensitive surface illuminable by the scintillations from said crystal, for converting same into electronic emissions, electron multiplication means in said tube to amplify said electronic emissions, a plate for collecting said magnified emissions, pulse shaping means in the form of a flip-flop circuit, a smoothing circuit and indicator electronically connected to said tube through said pulse shaping means for signalling the characteristics of the radiation bombarding said crystal, and a shield surrounding said crystal for preventing moisture deterioration of said crystal and for reflecting scintillations internally.

10. In a meter for the detection and measuring of gamma rays, in combination, a crystal capable of scintillating under the impact of gamma rays, said meter including a photo-multiplying tube, said tube including a photo-sensitive surface illuminable by the scintillations from said crystal, for converting same into electronic emissions, electron multiplication means in said tube to amplify said electronic emissions, a plate for collecting said magnified emissions, pulse-shaping means in the form of a flip-flop circuit, a smoothing circuit and indicator electronically connected to said tube through said pulse-shaping means for signalling the characteristics of the radiation bombarding said crystal, and thereby indicating the nature of the radiation source, and a shield surrounding said crystal, for preventing moisture deterioration of said crystal and for reflecting scintillations internally.

11. In a meter for the detection and measuring of gamma rays, in combination, a crystal capable of scintillating under the impact of gamma rays, said crystal being formed of sodium iodide activated with thallium, said meter including a photo-multiplying tube, said tube including a photo-sensitive surface illuminable by the scintillations from said crystal, for converting same into electronic emissions, electron multiplication means in said tube to amplify said electronic emissions, a plate for collecting said magnified emissions, pulse-lengthening means connected to said plate, a cathode follower circuit for reducing the output capacity of said tube and thereby increasing the voltage output thereof, pulse-shaping means in the form of a flip-flop circuit, and a smoothing circuit and indicator electronically connected to said tube via said cathode follower and said pulse-shaping means, for signalling the characteristics of the radiation bombarding said crystal thereby indicating the nature of the radiation sources, said crystal being of polyhedral configuration and secured by the base thereof to said tube adjacent said photo-sensitive surface, and a foil shield surrounding said crystal for preventing moisture deterioration thereof, and for reflecting scintillations internally.

12. In a meter for the detection and measuring of gamma rays, in combination, a single unit crystal having a mass of at least 10 grams, capable of scintillating under the impact of gamma rays, said meter having a photo-sensitive surface illuminable by the scintillations from said crystal, for converting same into electronic emissions, and a rate meter remotely connected electronically to said means for signalling the characteristics of the radiation bombarding said crystal.

13. In a meter for the detection and measuring of gamma rays in oil well bore holes, in combination, a single unit crystal having a mass of at least 10 grams, capable of scintillating under the impact of gamma rays, said meter including a photo-multiplying tube, said crystal being secured adjacent to the end of said tube, and means for signalling the characteristics of the radiation bombarding said crystal, said means including a rate meter remotely connected electronically to said photo-multiplying tube.

14. In a meter for the detection and measuring of gamma rays in oil well bore holes, in combination, a single unit crystal having a mass of at least 10 grams, capable of scintillating under the impact of gamma rays, a photo-sensitive surface in association with said crystal, means for signalling the energy characteristics of the radiation bombarding the crystal, whereby the nature of the radiation sources is ascertained, said means including an amplitude discriminator electronically connected to said photosensitive surface.

15. An instrument designed and adapted for detecting measuring and recording in an aircraft while in flight the intensity of gamma radiation from the earth's surface, comprising a crystal unit capable of producing scintillations when under the impact of gamma rays, a photomultiplier means so positioned as to receive scintillations from said crystal and capable of converting them into photo electrons and increasing the number thereof to produce a voltage pulse, means for amplifying the said voltage pulse, discriminating means capable of selecting pulses above a predetermined height, means for recording the pulses thus selected, and a rate meter with an appropriate time constant for averaging the rate of arrival of the selected pulses before they are recorded.

16. An instrument as defined in claim 15, which also includes at least one smoothing circuit in cooperation with the recording means.

17. An instrument as defined in claim 16, in which the smoothing circuit arrangement is dual, each circuit having a different time constant, adapted to operate simultaneously or independently in cooperation with separate recording means.

18. An instrument as defined in claim 15, which also includes a pulse-shaping means in association with the rate meter.

19. A device for the detection and measuring of atomic radiation, comprising; a crystal capable of scintillating under the effect of said radiation; electronic means for generating current pulses in response to said scintillations; means for converting said current pulses into damped voltage oscillations of predetermined frequencies; and electronic means controlled by said oscillations, including means for indicating energy characteristics of the radiation impinging on said crystal.

20. Apparatus for sub-surface investigation and analysis, comprising in combination transparent means having the ability to scintillate under radiation bombardment, said means having a mass of at least 10 grams, amplifier means for receiving said scintillations and multiplying the effect thereof, and electronic means controlled by the output of said amplifier, including means for indicating the characteristics of the radiation bombarding said transparent means.

21. Apparatus for the investigation of energy characteristics of penetrative radiation having the ability to produce secondary particles, comprising in combination means having the ability to produce scintillations upon bombardment by said radiation, said means including a body transparent to its own scintillations and having a thickness greater than the range of said secondary particles produced by said radiation in said body, amplifier means for receiving said scintillations and multiplying the effect thereof, and electronic means controlled by the output of said amplifier, including means for indicating the energy characteristics of the radiation bombarding said scintillating means.

22. Apparatus for the investigation of energy characteristics of gamma quanta, comprising in combination scintillating means, said gamma quanta having the ability to produce photoelectrons in said scintillating means, said scintillating means including a body transparent to its own scintillations and absorbing completely the energy of said photoelectrons, amplifier means for receiving the scintillations of said scintillating means and multiplying the effects thereof, and electronic means controlled by the output of said amplifying means, including means for indicating the energy characteristics of said gamma quanta bombarding said scintillating means.

23. Apparatus for investigation of matter, comprising in combination means adapted in response to fast neutron bombardment to scintillate by virtue of proton recoil, amplifier means for receiving said scintillations and providing output pulses determined by the magnitude of said scintillations, integral discriminator means operated by the output of said amplifier means and capable of passing all pulses above a preselected energy, and indicating means operated by the output of said integral discriminator means for indicating characteristics of the matter under investigation.

References Cited in the file of this patent

UNITED STATES PATENTS

| Number | Name | Date |
|---|---|---|
| 2,550,106 | Coltman et al. | Apr. 24, 1951 |
| 2,595,552 | Thomas | May 6, 1952 |
| 2,617,945 | Lord, Jr. et al. | Nov. 11, 1952 |
| 2,648,012 | Scherbatskoy | Aug. 4, 1953 |

OTHER REFERENCES

Model 100 Counting-Rate Meter, Gallagher et al., MDDC 1297, pp. 1–7, September 12, 1947.

Atomic Energy Publication #193—An Alpha Scintillation Counter for Health Physics and Dust Study Application.

Review of Scientific Instruments, vol. 18, #10, October 1947, Scintillation Counter for the Detection of Alpha-Particles, by Sherr.

Atomic Energy Publication #2203—Solid Counters: Scintillation Counters, by Louis Wouters.